(12) United States Patent
Chang et al.

(10) Patent No.: US 8,593,457 B2
(45) Date of Patent: Nov. 26, 2013

(54) METHOD OF THREE-DIMENSIONAL IMAGE DATA PROCESSING

(75) Inventors: Hsiu-Ming Chang, Hsinchu (TW);
Ann-Shyn Chiang, Hsinchu (TW);
Chao-Chun Chuang, Hsinchu (TW);
Chang-Huain Hsieh, Hsinchu (TW);
Chih-Yung Lin, Taipei (TW)

(73) Assignee: National Tsing Hua University, Hsinchu (TW)

( * ) Notice: Subject to any disclaimer, the term of this patent is extended or adjusted under 35 U.S.C. 154(b) by 644 days.

(21) Appl. No.: 12/789,287

(22) Filed: May 27, 2010

(65) Prior Publication Data
US 2011/0292047 A1 Dec. 1, 2011

(51) Int. Cl.
*G06T 17/00* (2006.01)

(52) U.S. Cl.
USPC .......................... 345/424; 345/419; 345/420

(58) Field of Classification Search
None
See application file for complete search history.

(56) References Cited

U.S. PATENT DOCUMENTS

| | | | |
|---|---|---|---|
| 5,381,518 A * | 1/1995 | Drebin et al. ................. | 345/424 |
| 7,680,526 B2 * | 3/2010 | McIntyre et al. ............. | 600/416 |
| 8,289,274 B2 * | 10/2012 | Sliwa et al. ................... | 345/108 |
| 2002/0113788 A1 * | 8/2002 | Bruijns ......................... | 345/424 |
| 2004/0070584 A1 * | 4/2004 | Pyo et al. ...................... | 345/419 |
| 2005/0271297 A1 * | 12/2005 | Zbilut et al. .................. | 382/278 |
| 2006/0114254 A1 * | 6/2006 | Day et al. ...................... | 345/424 |
| 2009/0001262 A1 * | 1/2009 | Visser et al. .................. | 250/282 |
| 2009/0184961 A1 * | 7/2009 | Hayashi et al. ............... | 345/424 |
| 2009/0190807 A1 * | 7/2009 | Rousso et al. ................ | 382/128 |

OTHER PUBLICATIONS

Patric Hagmann et al., Mapping the Structural Core of Human Cerebral Cortex, PLoS Biology, Jul. 2008, pp. 1-15, vol. 6-Issue 7.

Cheng-Chi Wu et al., Algorithm for the Creation of the Standard *Drosophila* Brain Model and its Coordinate System, 5th International Conference on Visual Information Engineering, 2008 pp. 478-483, Institution of Engineering and Technology, Stevenage, England, Aug. 2008.

Ping-Chang Lee et al., A Semi-Automatic Method for Neuron Centerline Extraction in Confocal Microscopic Image Stack, IEEE International Symposium on Biomedical Imaging, 2008, pp. 959-962, May 2008.

Sandeep Robert Datta et al., The *Drosophila* Pheromone cVA Activates a Sexually Dimorphic Neural Circuit, Nature, Mar. 2008, pp, 473-477, vol. 452, Nature Publishing Group.

* cited by examiner

*Primary Examiner* — Said Broome
(74) *Attorney, Agent, or Firm* — WPAT, P.C.; Anthony King

(57) ABSTRACT

The present invention relates to the field of data processing, and particularly to a software system and associated method for 3D image processing. The invention is to transform 3D images into space codes, and further align code-associated 3D images with known data within a target database.

9 Claims, 11 Drawing Sheets
(9 of 11 Drawing Sheet(s) Filed in Color)

Neuron I.D.

General Information

Name: dTdc2-F-000004   Soma Coordinate: X: 27, Y: 5, Z: 101   Author: AS_Chiang (2009-11-19)

Gene: Drosophila tyrosine decarboxylase 2   Neurotransmitter: Octopamine   Stock: dTdc2-GAL4

Gender/Age: Female / Adult 5-15d   Birth Timing: embryo   Lineage:

Annotation

Images

LSM                Standard                Skeleton

Spatial Distribution

Space Coding

F₍₍₍₍Ι₍₍₍₍₎₎Pp

Space Similarity

METHOD OF THREE-DIMENSIONAL IMAGE DATA PROCESSING

FIELD OF THE INVENTION

The present invention relates to the field of data processing, and particularly to a software system and associated methods for 3D image comparisons. The invention is to transform 3D images into space codes, and further align code-associated 3D images with known data within a target database.

DESCRIPTION OF PRIOR ART

With the efforts of scientists in the 20th century, people widely accept that the brain may be described as a modular system. Thus, based on the concepts of anatomy, illustrating the functions of the brain is done by parts. With the 3D image reconstruction technique, the scientists can establish models of the main brain parts. They can further reconstruct these models in all possible combinations which represent the spatial relationship between neural clusters and neural networks with functional significances.

In the study of 2008, Patric H. et al. (*PLoS Biology*, volume 6, Issue 7, e159) derived cortical connection matrices of human brain, which structurally and functionally segregated the specialized region of human cerebral cortex. By using spectrum imaging, the study resulted analysis of large-scale brain networks, where the network illustrated brain regions with structural core share high degree of relativity and constitute connector hubs that link all major structure modules as well. While human brain study is limited to the cortex of the brain, animal model is an alternative for brain study.

There are approximately 100 more thousand neurons in a fly brain. The system is composed of a network of neurons and other supportive cells. Neurons form functional circuits, each responsible for specific tasks in behaviors, at the cellular level. This is the most missing link in neuroscience studying from the molecular level to the cognitive level.

At the molecular level, the basic questions address in molecular neuroscience include the mechanisms by which neurons express and respond to molecular signals and how axons form complex connectivity patterns. At this level, tools from molecular biology and genetics are used to understand how neurons develop and die, and how genetic changes affect biological functions. The morphology, molecular identity and physiological characteristics of neurons and how they relate to different types of behavior are also of considerable interest.

To observe and recognize the morphology of neurons, it is important to figure out their images in 3D space. Therefore, it is essential to establish an algorithm for 3D neuron image pattern recognition and comparison. However, it is very difficult and time consuming to do 3D neuron image pattern recognition in an arbitrary space (since the brain is a complicated environment), and the result can not be verified if no regional information within the brain is available.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

SUMMARY OF THE INVENTION

Figure 1:
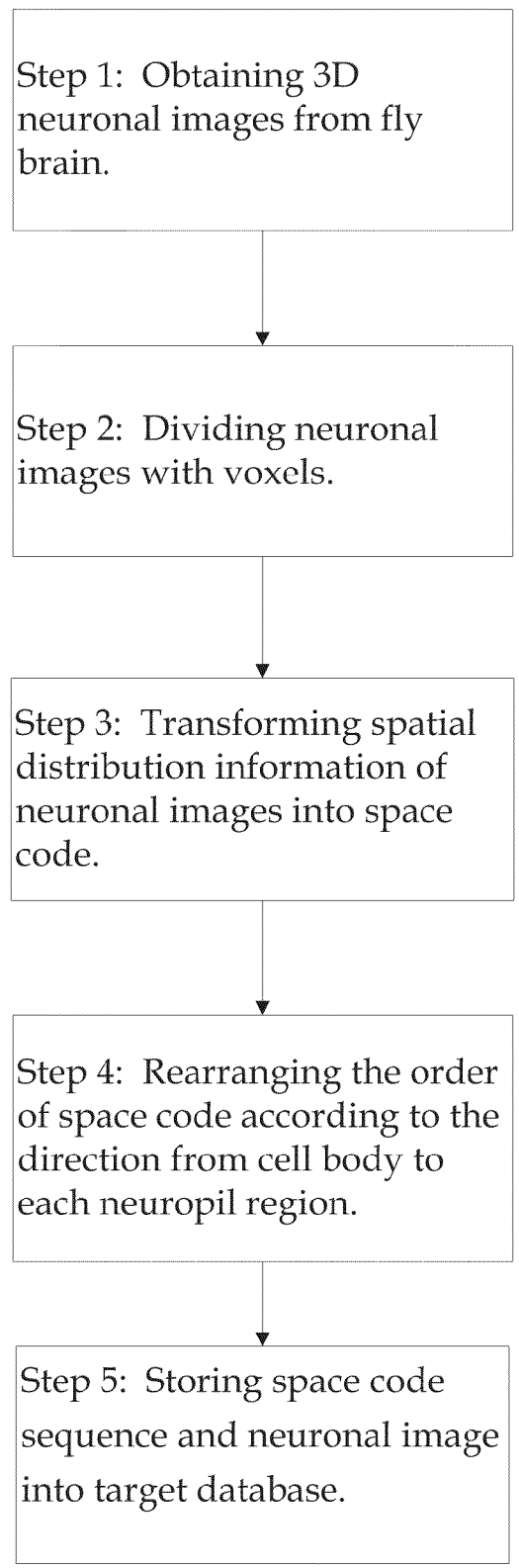
FIG. 1 provides a flow chart of process for converting 3D neuron images into space code.

To establish an algorithm for 3D neuron image pattern recognition and comparison, the present invention provides a method of 3D image data processing. By transforming 3D image data into space code, it is easier for scientists and people of medical professions to do neuron image comparison, and the result of neuron comparison provides important information of both functional and structural neuronal network.

The present invention provides an efficient and fine method for neuronal image analysis. While the study of Patric H. et al. restricts to the analysis of nervous system of brain surface, the present invention is able to do whole 3D brain analysis in single neuron level. When in single neuron level, by using the space coding method of the present invention, the route map of each neuron can be constructed. While further attached with the information of neurotransmitters released of each neuron, the biological function of each neuronal network is thereby concluded.

The present invention provides a method of 3D image data processing and collecting processed data into a target database, comprising the following steps:

selecting a 3D image data from a source file, wherein the 3D image consists of single neuron image within multiple space regions in a standard area;

dividing the 3D image with voxels, and defining each space region with different characters;

transforming spatial distribution information of the 3D image into a sequence of characters, which is simplified as space code; and collecting the 3D image data and the results of previous step in a targeted database.

DETAILED DESCRIPTION OF THE INVENTION

The present invention provides a method of 3D image data processing and image alignment. The following uses fly brain image as an example to describe the technical field of the present invention, while not limits its scope.

In the present invention, the structure of the neuronal image database was built for individual single neurons in the *Drosophila* brain and a unified space coordinate was established to associate each neuron and the whole brain space. The space coordinate was illustrated in a standard brain. The standard brain was averaged from multiple brain sample images of neurons and neuropils (Wu, C. C. et al., 2008 *5th International Conference on Visual Information Engineering VIE*, Xi'an, China, pp. 478-483).

The present invention provides a method of 3D image data processing and collecting processed data into a target database, comprising the following steps:

selecting a 3D image data from a source file, wherein the 3D image consists of single neuron image within multiple space regions in a standard area;

dividing the 3D image with voxels, and defining each space region with different characters;

transforming spatial distribution information of the 3D image into a sequence of characters, which is simplified as space code; and collecting the 3D image data and the results of previous step in a targeted database.

In the first step, the 3D image here comprises biological image and route map. The biological image is fly neuron image which comprises neuron cell body and neurites. The fly neuron image is normalized for its position within a standard fly model brain, and the route map comprises geographic locations and routes connecting each location.

In the second step, each space region is assigned with a single character wherein the character comprising alphabets and numerals including Arabic numbers.

The voxel here means a volume element, representing a value on a regular grid in three dimensional spaces. The standard area is defined as a region of certain voxel numbers and a stationary environment consisting of fixed biological anatomic regions or geographic locations.

In the third step, wherein transforming spatial distribution information of the image into a sequence of character comprises the following steps:
(a) evaluating spatial distribution information of the image in each space region by the results of equation: A times [$\log_y$ m], wherein A indicates the character of each space region, $_y$ is a positive real number, m stands for the voxel numbers of the image and [$\log_y$ m] is an integer ;
(b) transforming the results of (a) into characters, wherein the quantification of spatial distribution information in each space region is represented by number of repetition of single character;
(c) combining repeated characters of each space region to form a sequence of characters, which is called space code; and
(d) selecting a hub position in the image and rearranging the space code of (c) according to the topology of routes starting from hub position.

"Neuropils" mentioned herein means felt works of interwoven dendrites and axons and of neuroglial cells in the central nervous system.

"Neuron innervation" mentioned herein means the distribution of nerve fibers to an organ or body region, which indicates the scatter of neurons over a range, area or volume of central nervous system. The general information of neuron innervation is represented by its spatial or geographic property within the range, area or volume in fly model brain.

"Hub position" mentioned herein refers to the crossings of routes in the same space region or between different space regions.

In a better exemplary embodiment, the present invention built up a structure of a neuronal image database, which established a unified space coordinate associated with each neuron and the whole brain space. The present invention divides the whole brain space into different regions with neurological significance, neuropils. The distribution of neurons among these regions can now be coded. Also, the relative spatial location of these regions provides a basis to construct a score table. The 3D pattern recognition can now be reduced to a sequential string alignment and analysis, the speed is almost instantaneous. Such a spatial distribution sequence, presented as a bar code, is associated with the neuron together with its biological characters, such as age, sex, and birth time or gene expression as a piece of information within the ID table for the neuron.

In the second step, the routes the template neuron is represented by the topology of the neuron innervations in each space region.

In the third step, the log likelihood ratio is computed using following equations:

$$S_{ij} = 2\log_2 \frac{q_{ij}}{p_i p_j},$$

wherein i,j means the number of voxels in each two space regions; Sij indicates log likelihood ratio of each two space regions, qij indicates the observed neighborhood probability of occurrence of each two space regions and $p_i p_j$ indicates the expected neighborhood probability of occurrence of each two space regions.

In the fourth step, the Needleman-Wunsch algorithm is used for space code comparison, which compares each character in space code of the two neuron images and computes a similarity score of the two space codes.

In the fifth step, the similar neuron images have similar three-dimensional structures are retrieved from database and their neurological significance may be predicted.

The template neuron image and similar neuron images are retrieved and displayed together in a neuron ID table. The neuron ID table comprises the name, coordinate of the soma and author of said template neuron image, while also include the origin of said template neuron sample such as labeled gene, reporter system and type of neurotransmitter released by said template neuron. While said neuron ID table further reveals gender, age and lineage of *Drosophila* and birth timing of embryo which derived said template neuron image.

EXAMPLE 1

Obtaining Neuronal Images

The following was an example for obtaining neuronal images.

Firstly, wild-type flies were transgenic with GFP (green-fluorescence protein). Canton-S $W^{1118}$ flies maintained on standard cornmeal/agar/ molasses medium at 25° C. were used for transgenic injections. The following transgenic fly lines were used: (i) yw,hs-FLP/+; $FRT^{g13}$, tubP-GAL80/$FRT^{g13}$,UAS-mCD8::GFP; TH-GAL4/+, (ii) hs-FLP, $FRT^{19A}$,tubP-GAL80/$FRT^{19A}$, UAS-mCD8::GFP; Gad1-GAL4/+; +, (iii) hs-FLP/VGlut-GAL4; $FRT^{g13}$,tubP-GAL80/$FRT^{g13}$, UAS-mCD8::GFP; +, (iv) hs-FLP,$FRT^{19A}$, tubP-GAL80/$FRT^{19A}$,UAS-mCD8::GFP; Tdc2-GAL4/+; +, (v) hs-FLP/+; FRD$^{g13}$,tubP-GAL80/FRT$^{g13}$,UAS-mCD8::GFP; TpH-GAL4/+, (vi) hs-FLP, FRT$^{19A}$, tubP-GAL80/FRT$^{19A}$, UAS-mCD8::GFP; Cha-GAL4, UAS-mCD8::GFP/+; +, obtained from the Fly Stock Center (Bloomington, Indiana University, Ind., USA).

Secondly, the transgenic flies were sacrificed and dissected. The neuron tissues of the fly were processed immediately. To ensure that most samples resulted at different time windows were covered in MARCM (Mosaic Analysis with a Repressible Cell Marker) labeling, neuronal samples of flies were under heat-shock treatment in a 37° C. water bath for 3 to 60 minutes. In addition, mouse 4F3 anti-discs large monoclonal antibody was added to neuronal samples at 4° C. for 2 days for background labeling.

Brain tissue samples were imaged under a Zeiss LSM 510 confocal microscope with the following settings: resolution 1024×1024, optical slice 2 μm for 20× objectives and 1 μm for 40× objectives, making the image stack composed of about 60 to 70 serial images under 20× objectives and 120 to 140 serial images under 40× objectives. The voxel size of x: y: z is 0.32×0.32×1 μm.

To compile all the collected single neuron images onto the common brain model, each individual GFP-labeled neuron image was first semi-automatically segmented with Amira 4.1.2 (Visualization Science Group, Merignac Cedex, France).

EXAMPLE 2

Space Code Generation of 3D Neuron Images

The example provided a method of several procedures to convert 3D fly neuron images (comprising neuron cell bodies and neuropils) into space code, wherein these neuron innervated in a standard area—a standard fly model brain with multiple neuropils within.

Please refer to FIG. 1, here illustrated a flow chart of converting 3D neuron images into space code.

Step 1: Obtaining 3D Neuronal Images

First obtaining 3D neuronal images from fly brain, wherein the process for neuron image was already mentioned in example 1.

Step 2: Dividing 3D Neuronal Images by Voxels

The neuronal images then divided by voxels. The voxel (a portmanteau of the words volumetric and pixel) is a volume element, representing a value on a regular grid in three-dimensional space. This is analogous to a pixel, which represents 2D image data in a bitmap (which is sometimes referred to as a pixmap).

Step 3: Transforming Spatial Distribution Information of Neuronal Images into Space Code In the third step, the spatial distribution of neurons was transformed into "space code", a sequence of characters representing the number of voxels occupied by fibers innervating in each neuropil regions.

Figure 2:
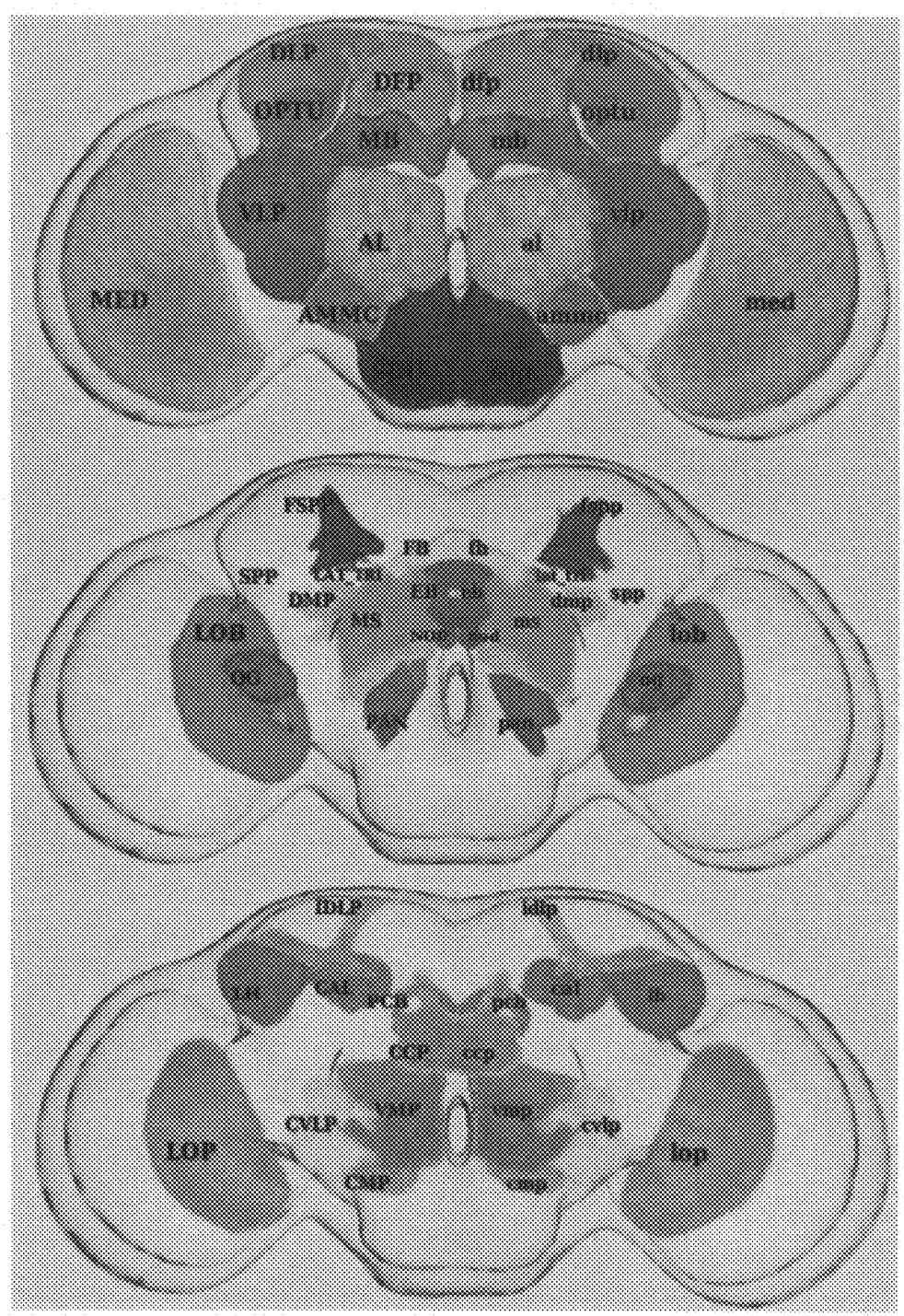
FIG. 2 illustrates the distribution of 29 neuropil regions in *Drosohphila* model brain.

Please refer to FIG. 2, fly model brain was defined by 58 neuropil regions, where AL was antennal lobe, AMMC was antennal mechanosensory and motor center, CAL was calyx, CCP was caudocentral protocerebrum, CMP was caudal-medial protocerebrum, CVLP was caudal ventrolateral protocerebrum, DFP was dorsofrontal protocerebrum, DLP was dorsolateral protocerebrum, DMP was dorso-medial protocerebrum, EB was ellipsoid body, FB was fan-shaped body, FSPP was frontal super-peduncelar protocerebrum, IDLP was inner dorsolateral protocerebrum, LH was lateral horn, LOB was lobula, LOP was lobula plate, LAT_TRI was lateral triangle, MB was mushroom body, MED was medulla, MS was mechanosensory, NOD was noduli, OG was optic glomerulus, OPTU was optic tubercle, PAN was proximal antennal protocerebrum, PCB was protocerebral bridge, SOG was subesophageal ganglion, SPP was super-peducular protocerebrum, VLP was ventral lateral protocerebrum, VMP was ventromedial protocerebrum.

In the right half of fly model brain, the codes of 29 neuropil regions were defined as different characters comprising capitalized alphabets or Arabic numbers, where AL:A, AMMC: B, CAL: C, CCP: D, CMP: E, CVLP: F, DFP: G, DLP: H, DMP: I, EB: J, FB: K, FSPP: L, IDLP: M, LH: N, LOB: O, LOP: P, LAT_TRI: Q, MB: R, MED: S, MS: T, NOD: U, OG: V, OPTU: W, PAN: X, PCB: Y, SOG: Z, SPP: 1, VLP: 3 and VMP: 5.

In the left half of fly model brain, the codes of 29 neuropil regions were defined as different characters of comprising smell letter alphabets or Arabic numbers, where al: a, ammc: b, cal: c, ccp: d, cmp:e, cvlp:f, dfp:g, dlp:h, dmp:i, eb:j, fb:k, fspp:l, idlp:m, lh:n, lob:o, lop:p, lat_tri:q, mb:r, med:s, ms:t, nod:u, og:v, optu:w, pan:x, pcb:y, sog:z, spp:2, vlp:4, vmp:6.

The example provided an equation to evaluate the spatial distribution of neurons, which result in "space code": a sequence of characters representing the number of voxels occupied by fibers innervating in each of 58 neuropil regions.

$$\text{Space Code} = \text{Neuropil Code} \times [\log_y m] \tag{I}$$

"m" stands for the number of voxels which neuron fibers innervate in a specific neuropil region, $_y$ is any positive real number and "[$\log_y m$]" is an integer that stands for the evaluation of spatial information of the neuron in said neuropil region.

Equation (I) was to evaluate spatial distribution in each neuropil region; here took antennal lobe (AL) neuropil region for example:

"Neuropil Code" was the specific character of AL region, which was A; "m" represented the number of voxels which neuron fibers innervate in AL region; "[$\log_y$ m]" was truncated as an integer; and "Neuropil Code" timed "[$\log_y$ m]" resulted in a plural number of "A"s, which represents the time of repetition of "A" in the space code sequence.

It was then composed the evaluation of each neuropil region into a string sequence of characters.

Figure 3:
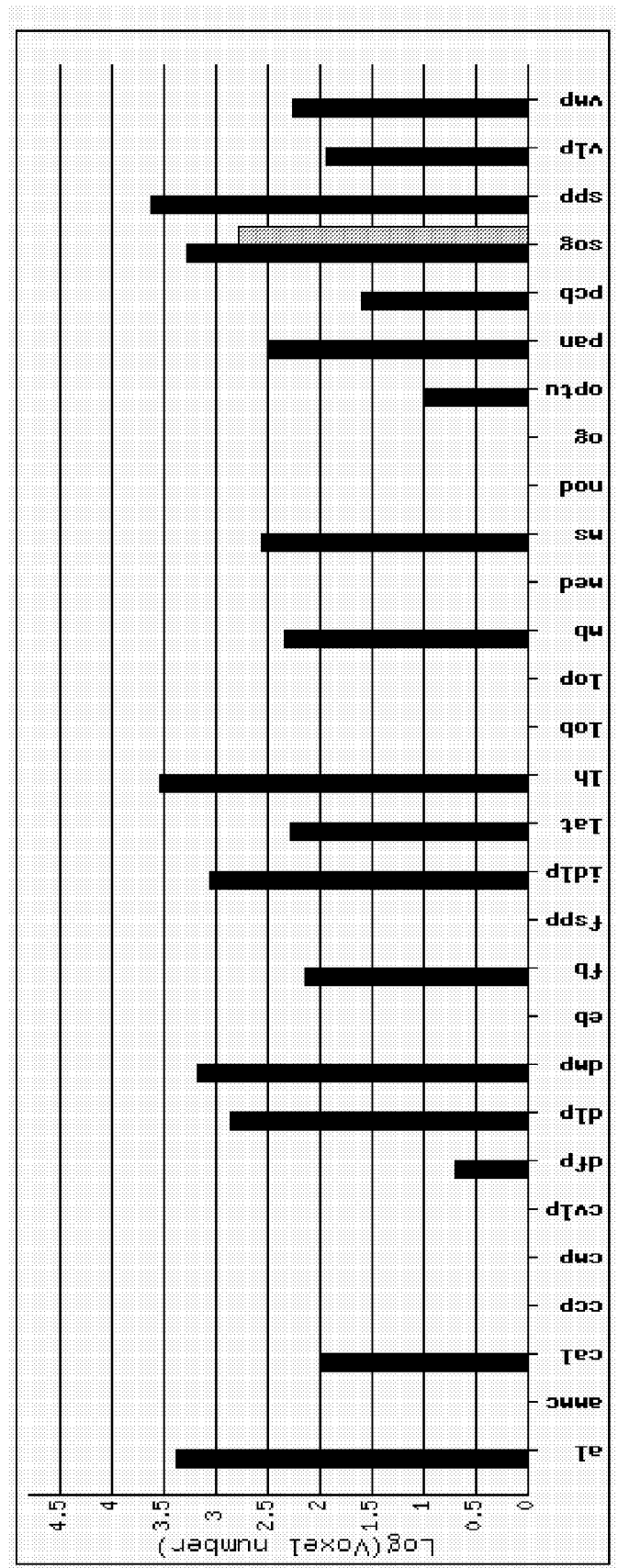
FIG. 3 indicates the quantification of spatial distribution of neuron, TpH-F-100060.

Took neuron TpH-F-100060 for example, the evaluation of voxels occupied by neuron fibers innervating in each of 58 neuropil regions were shown in FIG. 3. The spatial information of the neuron in each region was computed using equation (I), and the results were transformed into a string of codes. The quantification of spatial information in each region was represented by plural codes for the very neuropil region.

Combining codes of each neuropil region and forming a string code sequence, which was called "space code". The space code of neuron TpH-F-100060 was aaaccghhhjjllmmmnnOOOrrvwwxyZZzzz2224466. (Sequence 1).

Step 4: Rearranging Space Code Sequence

Figure 4:
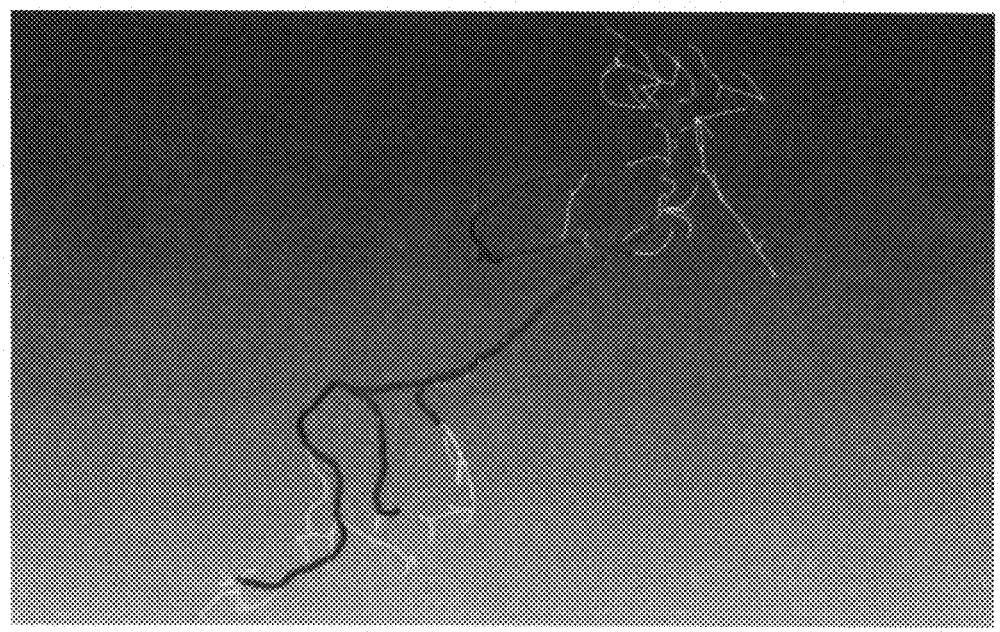
FIG. 4 indicates the tracing map of neuron, TpH-F-100060.
Figure 5:
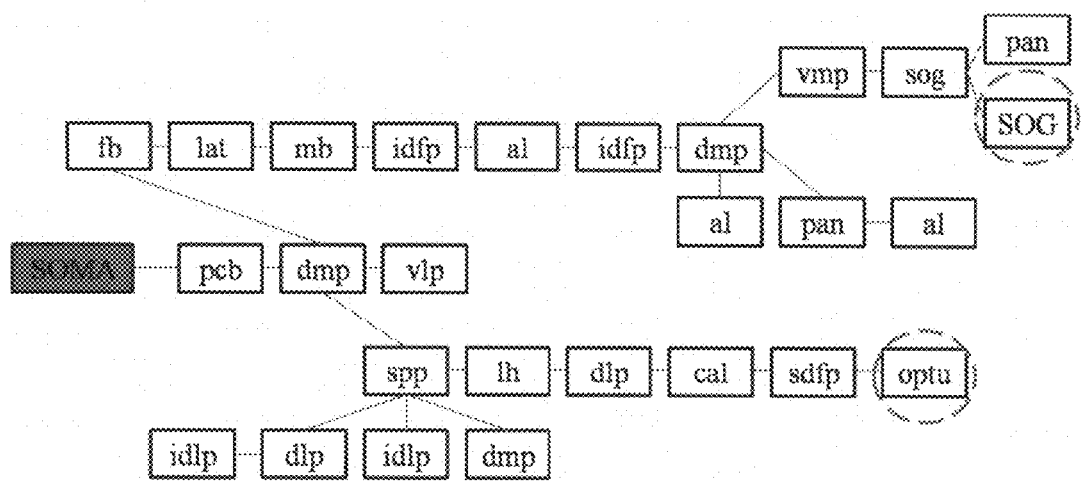
FIG. 5 indicates the topology map of neuron, TpH-F-100060.

While the order of codes in sequence 1 was not fully representing the order of neuron innervations, the space code for a neuron innervating on its way required further rearrangement. According to trace algorithm from Lee and others (Lee P. C. et al., 2008 5th IEEE International Symposium on Biomedical Imaging, p. 959-962), the order of codes was rearranged along the direction from cell body to each neuropil region (FIGS. 4 and 5). Thus, code sequence was associated with the neuropils on the route of the neuronal trace. According to the map of neuron tracing in FIG. 5, the order of neuropil regions that TpH-F-100060 innervated was listed below: SOG, sog, pan, vmp, dmp, al, idfp, mb, lat, fb, pcb, spp, vlp, lh, idlp, dlp, cal, sdfp, optu. The code sequence of TpH-F-100060 was rearranged as ZZzzzww66hhaaallrrnnjjx22244000mmmgggccyv (Sequence 2).

Step 5: Storing Space Code Sequence and Neuronal Image into Target Database

After rearrangement, neuronal images and space code sequences were stored into a computer-readable recording medium. Said computer-readable recording medium comprises a magnetic storage device, an optical storage device, or an electronic storage device that can be on a PC or a remote device connected via a transmission system.

EXAMPLE 3

Scoring Algorithm for Neighborhood Relationships Among 3D Neuron Images

Since alphabetic sequence didn't reflect neighborhood relationships of neuron innervated neuropil regions, the present invention provided a scoring algorithm that puts neighborhood relationships into consideration. A simplified example was shown in Table 1, a 2D distribution of four different regions, A, B, C and D, was used to show the scoring algorithm. Eventually, a log likelihood matrix that reflexes the degree of surroundings by its neighbors was constructed.

TABLE 1

An example of grid table for creating the log likelihood matrix of spatial relationships among neuropils.

| A | A | A | A | D | D | D | D |
| A | A | A | A | D | D | D | D |
| A | A | A | A | D | D | D | D |
| A | A | A | A | D | D | D | D |
| B | B | B | C | C | C | C | C |
| B | B | B | C | C | C | C | C |
| B | B | B | C | C | C | C | C |
| B | B | B | C | C | C | C | C |

Firstly, the present invention derived a neighbor count table. There were 3 B grids, 1 C grid and 4 D grids that surround region A, thus there were 3 AB neighborhoods, 1 AC neighborhood, 4 AD neighborhoods and 16 AA neighborhoods in region A. This procedure was repeated for all grids of 4 regions with the summed results stored in a table. For those not in the neighborhood, a small positive number, such as 0.1, was given as the count. Table 6 was used to calculate a matrix representing the odds ratio between these observed counts and those expected by chance.

Computing Algorithm of Odds Matrix

The construction of odds matrix was modified from an algorithm used for protein sequence analysis (S Henikoff and J G Henikoff). Referred to Table 2, let the total number of regions i, j pairs (i=A~D, j=A~D) for each entry of the count table to be $f_{ij}$. Then the observed probability of occurrence for each i, j pair was $$q_{ij} = \frac{f_{ij}}{\sum_{i=A}^{D} \sum_{j=A}^{i} f_{ij}}. \quad (II)$$

TABLE 2

The observed frequency of occurrence for each i, j pair.

| $f_{ij}$ | A | B | C | D |
|---|---|---|---|---|
| A | 16 | 3 | 1 | 4 |
| B | 3 | 12 | 4 | 0.1 (0) |
| C | 1 | 4 | 20 | 4 |
| D | 4 | 0.1 (0) | 4 | 16 |

For the grids of region A in the example, where $f_{AA}$=16, $f_{AB}$=3, $f_{AC}$=1, and $f_{AD}$=4; $q_{AA}$/80, qAB=3/80, $q_{AC}$=1/80 and $q_{AD}$=4/80. (Table 3)

TABLE 3

The observed probability of occurrence for each i, j pair.

| $q_{ij}$ | A | B | C | D |
|---|---|---|---|---|
| A | 16/80 | 3/80 | 1/80 | 4/80 |
| B | 3/80 | 12/80 | 4/80 | 0.1/80 (0) |
| C | 1/80 | 4/80 | 20/80 | 4/80 |
| D | 4/80 | 0.1/80 (0) | 4/80 | 16/80 |

Secondly, estimate the expected probability of occurrence for each i, j pair. It was assumed that the observed pair frequencies were those of the population. For the example, 16 grids had A in both positions of the pair and 8 pairs had A at only one of the two positions in region A, thus the expected probability of A in a pair was [16+(8/2)]/80=0.25. In general, the probability of occurrence of the ith grid in an i, j pair was $$p_i = q_{ii} + \sum_{j|i} \frac{q_{ij}}{2}. \quad (III)$$

The expected probability of occurrence $e_{ij}$ for each i, j pair was $p_i p_i p_j$ for i=j and $p_i p_j + p_i p_j = 2 p_i p_j$ for i≠j. The expected probability of AA was 0.25*0.25=0.0625, the expected probability of AB+BA was 2*(0.25*0.19)=0.095 and that of BB was 0.19*0.19=0.036. An odd ratio matrix was calculated where each entry was $q_{ij}/e_{ij}$. (Table 4)

TABLE 4

The probability of occurrence of the ith grid.

| $p_i$ | A | B | C | D |
|---|---|---|---|---|
| | 20/80 | 15.5/80 | 24.5/80 | 20/80 |

A log ratio was then calculated in bit units as $s_{ij}$=log$_2$ ($q_{ij}/e_{ij}$). If the observed probability was as expected, $s_{ij}$=0; if less than expected, $s_{ij}$<0; if more than expected, $s_{ij}$>0. Follow the previous algorithm, the odds ratio was redefined in table 5 using following equation $$S_{ij} = 2 \log_2 \frac{q_{ij}}{p_i p_j}. \quad (VI)$$

TABLE 5

The log likelihood ratio for each i, j pair.

| $s_{ij}$ | A | B | C | D |
|---|---|---|---|---|
| A | 3.36 | −0.74 | −5.23 | −0.64 |
| B | −0.74 | 4.00 | −0.49 | −10.55 |
| C | −5.23 | −0.49 | 2.83 | −1.23 |
| D | −0.64 | −10.55 | −1.23 | 3.36 |

The whole space of fly model brain was then redivided with 4 voxels on each side as a unit grid, which lowing the dpi (Dots per Inch) of the neuron image. The spatial distribution of neurons was then recalculated according to new space units. A log likelihood matrix for neighborhood relationships of neuron innervated in 58 neuropil regions was generated under such condition, represented in table 6. While the corresponding regions in the left and right hemispheres of fly brain was calculated as a whole, the 58 neuropil regions of fly brain could be simplified as 29 neuropil regions.

TABLE 6

The log likelihood matrix of 29 neuropil regions.

| | SOG | AMMC | AL | MB | DFP | FB | LAT | EB | NOD | DMP | PAN | MS | CMP | CVLP | VMP |
|---|---|---|---|---|---|---|---|---|---|---|---|---|---|---|---|
| SOG | 6 | 3 | −1 | −22 | −22 | −20 | −14 | −16 | −14 | −13 | 2 | −20 | 3 | −12 | −1 |
| AAMC | 3 | 8 | −3 | −19 | −19 | −17 | −11 | −13 | −11 | −7 | 4 | −17 | 2 | 3 | 1 |
| AL | −1 | −3 | 8 | −3 | −20 | −18 | −12 | −4 | −12 | −3 | 4 | 4 | −17 | −19 | −14 |
| MB | −22 | −19 | −3 | 6 | 3 | −1 | −1 | 4 | −13 | −1 | −16 | 4 | −17 | −20 | −21 |
| DFP | −22 | −19 | −20 | 3 | 6 | 3 | 4 | −2 | −13 | −5 | −16 | −2 | −18 | −20 | −21 |
| FB | −20 | −17 | −18 | −1 | 3 | 8 | 6 | 7 | 6 | 2 | −14 | −3 | −15 | −18 | −19 |
| LAT | −14 | −11 | −12 | −1 | 4 | 6 | 11 | −7 | −5 | 2 | −8 | 2 | −9 | −12 | −13 |
| EB | −16 | −13 | −4 | 4 | −2 | 7 | −7 | 10 | 8 | −1 | −11 | 3 | −12 | −14 | −15 |
| NOD | −14 | −11 | −12 | −13 | −13 | 6 | −5 | 8 | 12 | 4 | −9 | −6 | −10 | −12 | −2 |
| DMP | −13 | −7 | −3 | −1 | −5 | 2 | 2 | −1 | 4 | 5 | 2 | 3 | −18 | −5 | 2 |
| PAN | 2 | 4 | 4 | −16 | −16 | −14 | −8 | −11 | −9 | 2 | 8 | 1 | −13 | −7 | 3 |
| MS | −20 | −17 | 4 | 4 | −2 | −3 | 2 | 3 | −6 | 3 | 1 | 7 | −16 | −18 | −19 |
| CMP | 3 | 2 | −17 | −17 | −18 | −15 | −9 | −12 | −10 | −18 | −13 | −16 | 9 | 5 | 1 |
| CVLP | −12 | 3 | −19 | −20 | −20 | −18 | −12 | −14 | −12 | −5 | −7 | −18 | 5 | 7 | 3 |
| VMP | −1 | 1 | −14 | −21 | −21 | −19 | −13 | −15 | −2 | 2 | 3 | −19 | 1 | 3 | 6 |
| CCP | −18 | −15 | −16 | −17 | 1 | 5 | −9 | −12 | 2 | 3 | −13 | −15 | −14 | −16 | 3 |
| PCB | −15 | −12 | −13 | −14 | 2 | −3 | −6 | −9 | −7 | 2 | −10 | −12 | −11 | −13 | −4 |
| CAL | −18 | −15 | −16 | −1 | 1 | −15 | −9 | −11 | −9 | 1 | −12 | −15 | −14 | −16 | −17 |
| FSPP | −18 | −15 | −16 | 3 | 2 | −4 | 4 | −12 | −10 | −17 | −12 | −15 | −14 | −16 | −17 |
| SPP | −21 | −18 | −19 | 0 | 0 | 0 | 3 | −15 | −12 | 1 | −15 | −18 | −17 | −19 | −20 |
| VLP | −23 | −1 | −3 | −2 | −22 | −20 | −14 | −17 | −15 | 0 | −18 | −1 | −19 | 1 | −2 |
| OPTU | −17 | −14 | −15 | 3 | −16 | −14 | −8 | −11 | −9 | −17 | −12 | −14 | −13 | −15 | −16 |
| DLP | −21 | −18 | −19 | −2 | −3 | −17 | −11 | −14 | −12 | −20 | −15 | −18 | −17 | −19 | −20 |
| IDLP | −18 | −16 | −17 | −1 | 3 | −15 | −9 | −12 | −10 | −18 | −13 | −15 | −14 | −17 | −18 |
| LH | −20 | −17 | −18 | −19 | −19 | −17 | −11 | −13 | −11 | −19 | −14 | −17 | −16 | −18 | −19 |
| OG | −16 | −13 | −14 | −15 | −15 | −13 | −7 | −10 | −8 | −16 | −11 | −13 | −12 | −1 | −15 |
| LOB | −23 | −20 | −21 | −22 | −22 | −20 | −14 | −17 | −14 | −22 | −17 | −20 | −19 | −4 | −22 |
| LOP | −22 | −19 | −20 | −21 | −21 | −19 | −13 | −16 | −14 | −22 | −17 | −19 | −18 | −20 | −21 |
| MED | −25 | −22 | −24 | −24 | −24 | −22 | −16 | −19 | −17 | −25 | −20 | −22 | −21 | −23 | −25 |

| | CCP | PCB | CAL | FSPP | SPP | VLP | OPTU | DLP | IDLP | LH | OG | LOB | LOP | MED |
|---|---|---|---|---|---|---|---|---|---|---|---|---|---|---|
| SOG | −18 | −15 | −18 | −18 | −21 | −23 | −17 | −21 | −18 | −20 | −16 | −23 | −22 | −25 |
| AAMC | −15 | −12 | −15 | −15 | −18 | −1 | −14 | −18 | −16 | −17 | −13 | −20 | −19 | −22 |
| AL | −16 | −13 | −16 | −16 | −19 | −3 | −15 | −19 | −17 | −18 | −14 | −21 | −20 | −24 |
| MB | −17 | −14 | −1 | 3 | 0 | −2 | 3 | −2 | −1 | −19 | −15 | −22 | −21 | −24 |
| DFP | 1 | 2 | 1 | 2 | 0 | −22 | −16 | −3 | 3 | −19 | −15 | −22 | −21 | −24 |
| FB | 5 | −3 | −15 | −4 | 0 | −20 | −14 | −17 | −15 | −17 | −13 | −20 | −19 | −22 |
| LAT | −9 | −6 | −9 | 4 | 3 | −14 | −8 | −11 | −9 | −11 | −7 | −14 | −13 | −16 |
| EB | −12 | −9 | −11 | −12 | −15 | −17 | −11 | −14 | −12 | −13 | −10 | −17 | −16 | −19 |
| NOD | 2 | −7 | −9 | −10 | −12 | −15 | −9 | −12 | −10 | −11 | −8 | −14 | −14 | −17 |
| DMP | 3 | 2 | 1 | −17 | 1 | 0 | −17 | −20 | −18 | −19 | −16 | −22 | −22 | −25 |
| PAN | −13 | −10 | −12 | −12 | −15 | −18 | −12 | −15 | −13 | −14 | −11 | −17 | −17 | −20 |
| MS | −15 | −12 | −15 | −15 | −18 | −1 | −14 | −18 | −15 | −17 | −13 | −20 | −19 | −22 |
| CMP | −14 | −11 | −14 | −14 | −17 | −19 | −13 | −17 | −14 | −16 | −12 | −19 | −18 | −21 |
| CVLP | −16 | −13 | −16 | −16 | −19 | 1 | −15 | −19 | −17 | −18 | −1 | −4 | −20 | −23 |
| VMP | 3 | −4 | −17 | −17 | −20 | −2 | −16 | −20 | −18 | −19 | −15 | −22 | −21 | −25 |
| CCP | 9 | 8 | −3 | −14 | −16 | −19 | −13 | −16 | −14 | −15 | −12 | −18 | −18 | −21 |
| PCB | 8 | 12 | 5 | −11 | −14 | −16 | −10 | −13 | −11 | −12 | −9 | −16 | −15 | −18 |
| CAL | −3 | 5 | 10 | −13 | 4 | −18 | −12 | 2 | 0 | −6 | −11 | −18 | −17 | −20 |
| FSPP | −14 | −11 | −13 | 8 | 3 | −8 | 5 | 4 | 4 | −1 | −11 | −18 | −17 | −21 |
| SPP | −16 | −14 | 4 | 3 | 6 | 0 | −15 | −1 | 2 | 4 | −14 | −4 | −20 | −24 |
| VLP | −19 | −16 | −18 | −8 | 0 | 5 | −1 | −4 | −19 | −1 | 4 | −4 | −23 | −9 |
| OPTU | −13 | −10 | −12 | 5 | −15 | −1 | 11 | 5 | −13 | −14 | −11 | −17 | −17 | −20 |
| DLP | −16 | −13 | 2 | 4 | −1 | −4 | 5 | 7 | 6 | 3 | −14 | −21 | −20 | −23 |
| IDLP | −14 | −11 | 0 | 4 | 2 | −19 | −13 | 6 | 7 | 4 | −12 | −19 | −18 | −21 |
| LH | −15 | −12 | −6 | −1 | 4 | −1 | −14 | 3 | 4 | 8 | −13 | −7 | −19 | −22 |
| OG | −12 | −9 | −11 | −11 | −14 | 4 | −11 | −14 | −12 | −13 | 10 | 3 | −16 | −6 |
| LOB | −18 | −16 | −18 | −18 | −4 | −4 | −17 | −21 | −19 | −7 | 3 | 6 | 3 | −1 |
| LOP | −18 | −15 | −17 | −17 | −20 | −23 | −17 | −20 | −18 | −19 | −16 | 3 | 6 | 0 |
| MED | −21 | −18 | −20 | −21 | −24 | −9 | −20 | −23 | −21 | −22 | −6 | −1 | 0 | 4 |

EXAMPLE 4

Clustering Analysis of Neighborhood Relationship

Figure 6:
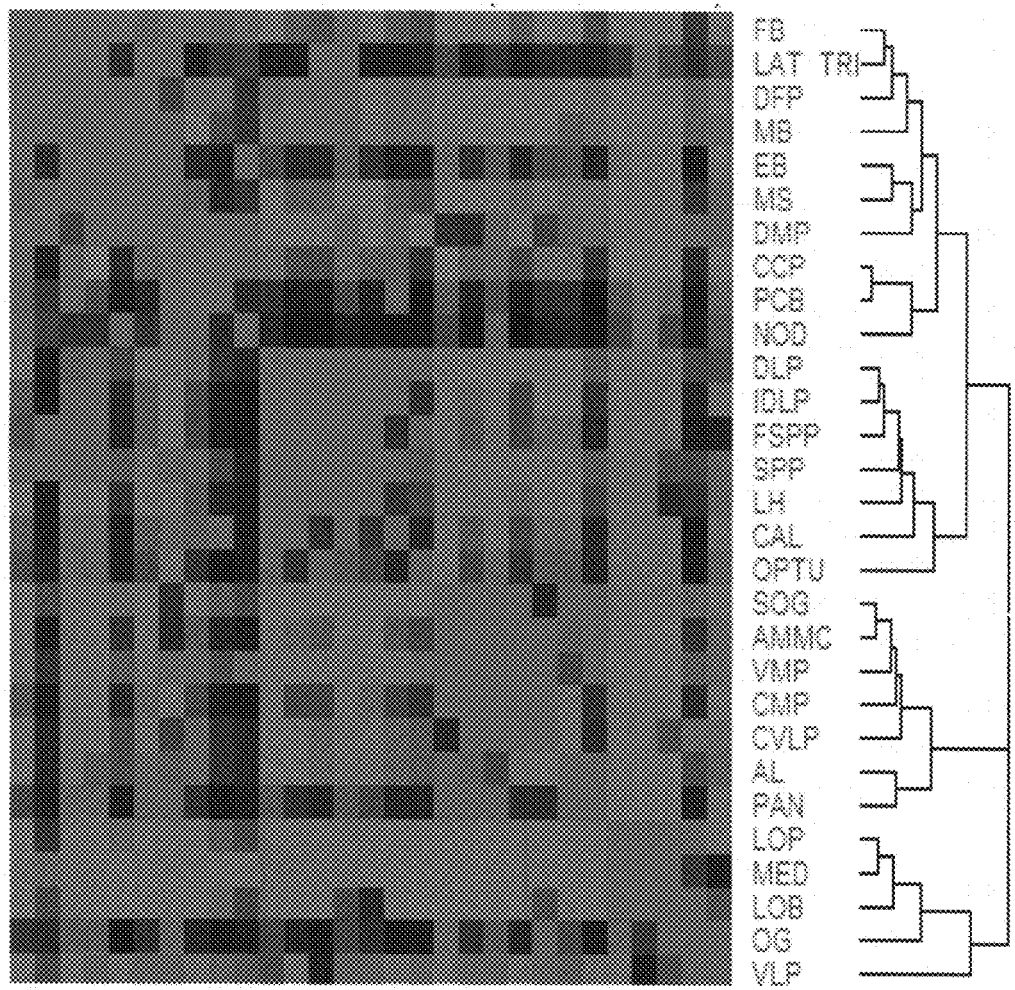
FIG. 6 represents the hierarchical cluster analysis of 29 neuropil regions.

For hierarchical cluster analysis (software created by Human-Computer Interaction Lab, University of Maryland), the Pearson's correlation coefficients were determined by an odds ratio matrix from the relationship of neighborhood among 58 neuropil regions (FIG. 2), and a 2D clustering dendrogram was created as FIG. 6.

The cluster analysis indeed confirmed the validity of the scoring table (Table 6). Thus, the code sequence created according to the score table reflects the neighborhood relationships among neuropil regions. Comparing to the clustering dendrogram (FIG. 6), the neuropil regions of neighborhood were clustered together, and the neighbor scores between neuropil regions were inverse ratio to their volume. Thus, code sequence would reflect spatial relationships among neuropil regions according to log likelihood matrix.

EXAMPLE 5

3D Neuron Image Alignment

GGSEARCH was used as an alignment tool to search for similar protein or nucleotide sequences in their corresponding database. Using an algorithm based on the Needleman and Wunsch, it calculated an alignment score which was global in the query and global in the library. The present invention used GGSEARCH as a tool for space code sequence alignment of 3D neuronal images.

Took neuron TpH-F-100060 as an example, the neuron was a template for 3D neuron image alignment. The neuronal image was already transformed into space code sequence by the method of example 2. A neighborhood table of spatial relationships of the neuron was generated according to the positions of each neuropil regions. And the log likelihood ratios of neighborhood probability among different space regions were computed using aforementioned equation (VI).

The alignment scores of the space code sequence of template image with other neuron images in corresponding database were then calculated using Needleman-Wunsch algorithm, and the neuronal images with similar space code sequences were parsed out.

Neuronal images with similar space code sequences further illustrated their structure similarity. While space codes of different neuronal images were generated according to their spatial distribution among 58 neuropil regions, similar space code sequences indicated that these neurons innervated among neuropil regions with the same order.

Figure 7:
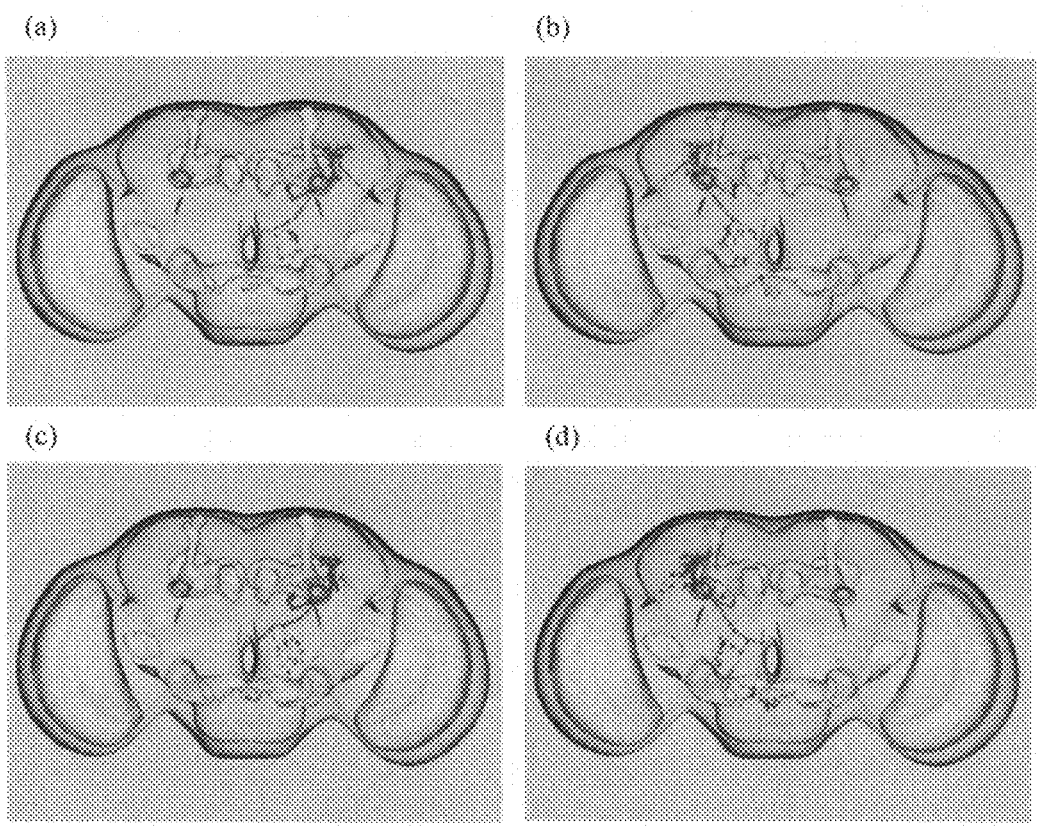
FIG. 7 represents the results of neuron structure alignment, which useTpH-F-10060 as template, and represent scores and similarities according to log likelihood table. (a)TpH-F-100060 (score:1130, similar:100.0%), (b)TpH-F-600087 (score:708, similar:71.8%), (c)TpH-F-100061 (score:637, similar:72.2%) and (d)VGlut-F-200225(score:605, similar: 76.3%).

FIG. 7 represented the result of neuron structure alignment, which used TpH-F-10060 as template, and represented scores and similarities according to log likelihood table.

(a)TpH-F-100060 (score:1130, similar:100.0%), (b)TpH-F-600087 (score:708, similar:71.8%), (c)TpH-F-100061 (score:637,similar:72.2%) and (d)VGlut-F-200225(score: 605, similar:76.3%).

By transforming the three-dimensional neuronal image into code sequence, the rate of comparison between two neuron images was as good as one-dimensional protein sequence alignment. The rate of three-dimensional alignment between neuronal images was so fast that it was useful to search neurons with similar structure in approximately 100,000 neurons of the adult fly brain. In addition, by aligning the code sequence of neurons, scientists could find neurons of similar structures not only among the same Gal4 driver, but also among the neurons with different ages, genders, genetic backgrounds, lineages, birth timings, birth places, and drivers (FIG. 7a-d).

EXAMPLE 6

Prediction and Validation of Neuronal Connection

Numerous projection neurons (simplified as PNs) relaying sensory inputs—including olfactory, vision, auditory, and gustatory—to higher brain centers were discovered. The following took olfactory PNs as an example. Stereotyped connectivity and odor-evoked activity occurred at every level of the *Drosophila* olfactory system, including the antennal, the antennal lobe (AL), the mushroom body (MB) and the lateral horn (LH).

Figure 8:
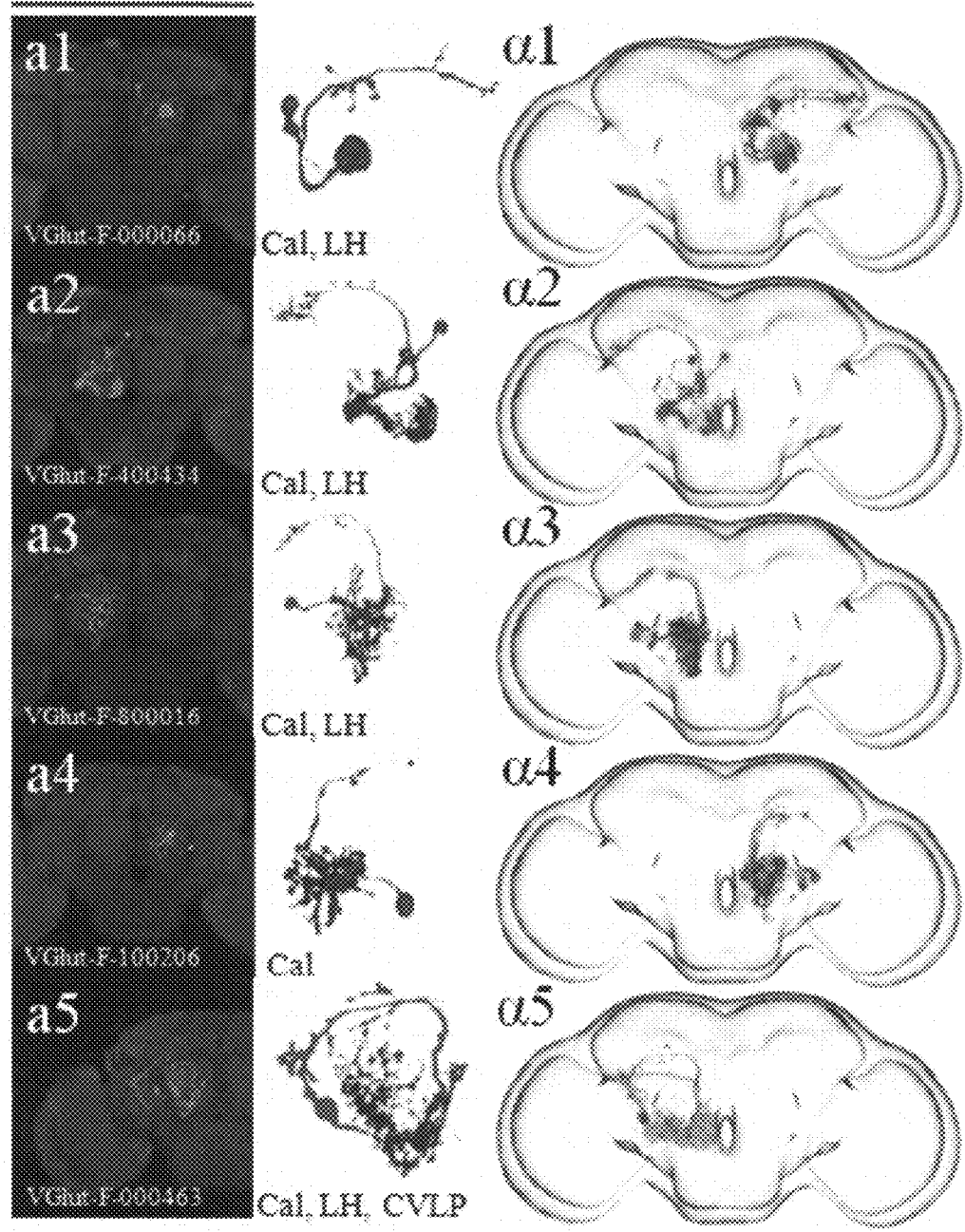
FIG. 8 represents unilateral projection neurons with similar three-dimensional structures.
Figure 9:
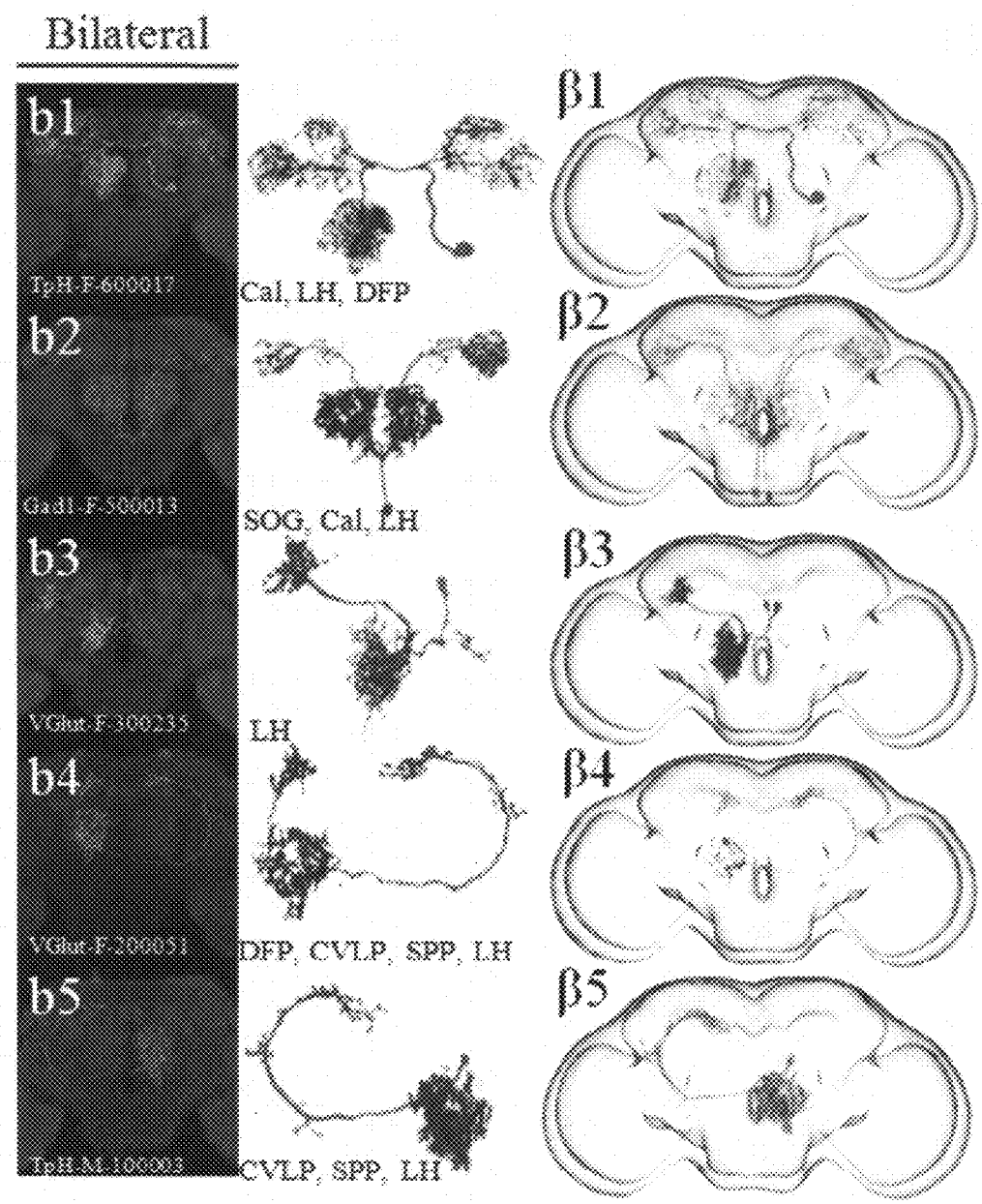
FIG. 9 represents bilateral projection neurons with similar three-dimensional structures.

FIG. 8 $\alpha 1 \sim \alpha 5$ and $\beta 1 \sim \beta 5$ presented 5 distinct types of unilateral PNs and bilateral PNs found in neurobiological lab. The example translated image $\alpha 1 \sim \alpha 5$, and $\beta 1 \sim \beta 5$ into space code sequences, and using the code sequences to search the database according to neighbor log likelihood matrix from 58 neuropil regions. Neurons of similar structures were parsed out. (FIG. 8 $\alpha 1$-$\alpha 5$ and FIG. 9 $\beta 1$-$\beta 5$)

Figure 10:
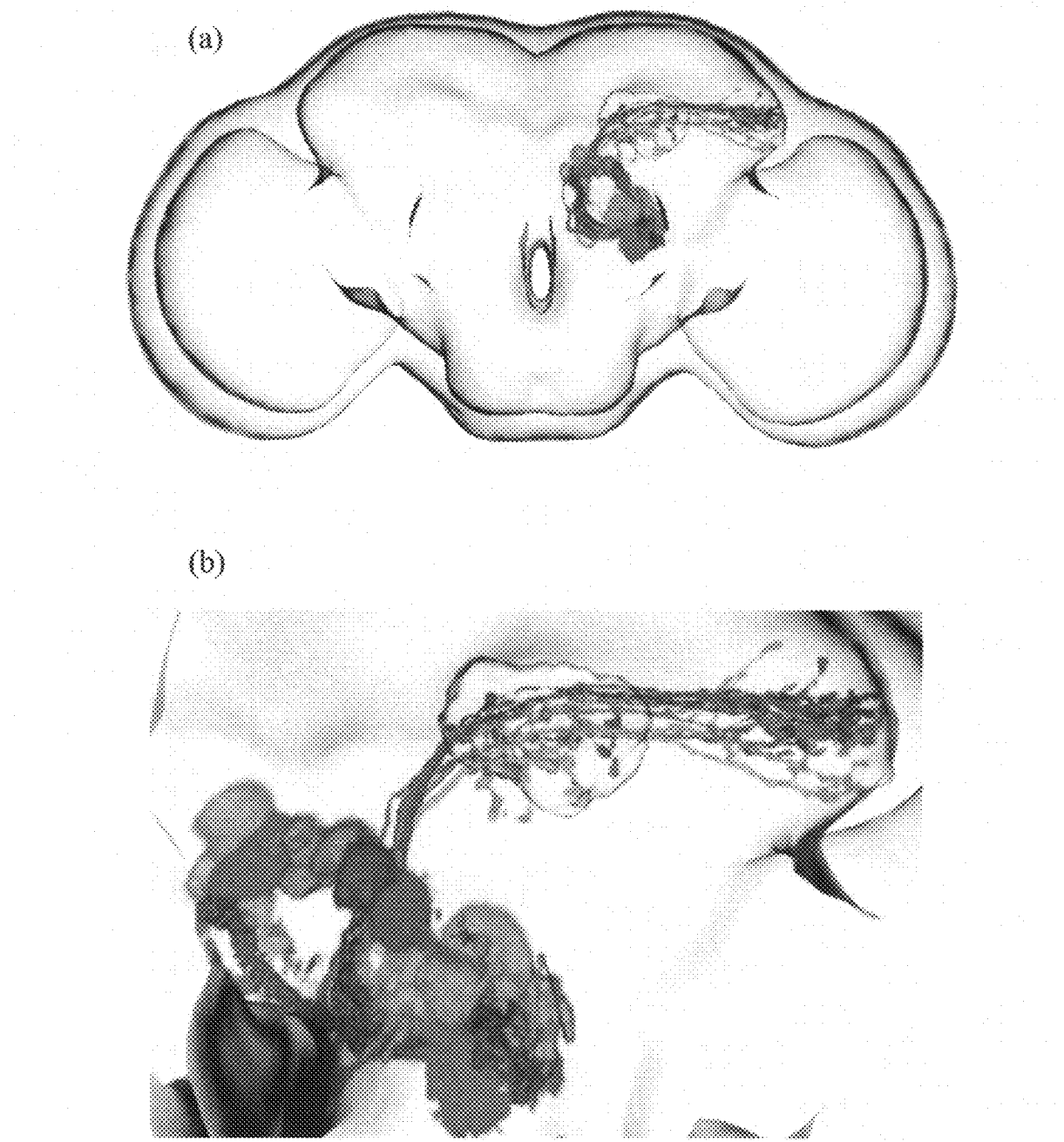
FIGS. 10*a* and 10*b* represent the synaptic location of neurons with similar structure distributed in calyx region. (VGlut-F-000066, Gad1-F-200073, VGlut-F-400280, VGlut-F-500118, VGlut-F-600005 and VGlut-F-500076).

By grouping the neuron with similar three-dimensional structures, the present invention easily found neurons with similar structures, (FIG. 8 a1 and FIG. 10) known to have rich synapses distributed in calyx region; the neurons were listed below: VGlut-F-000066, Gad1-F-200073, VGlut-F-400280, VGlut-F-500118, VGlut-F-600005 and VGlut-F-500076.

Figure 11:
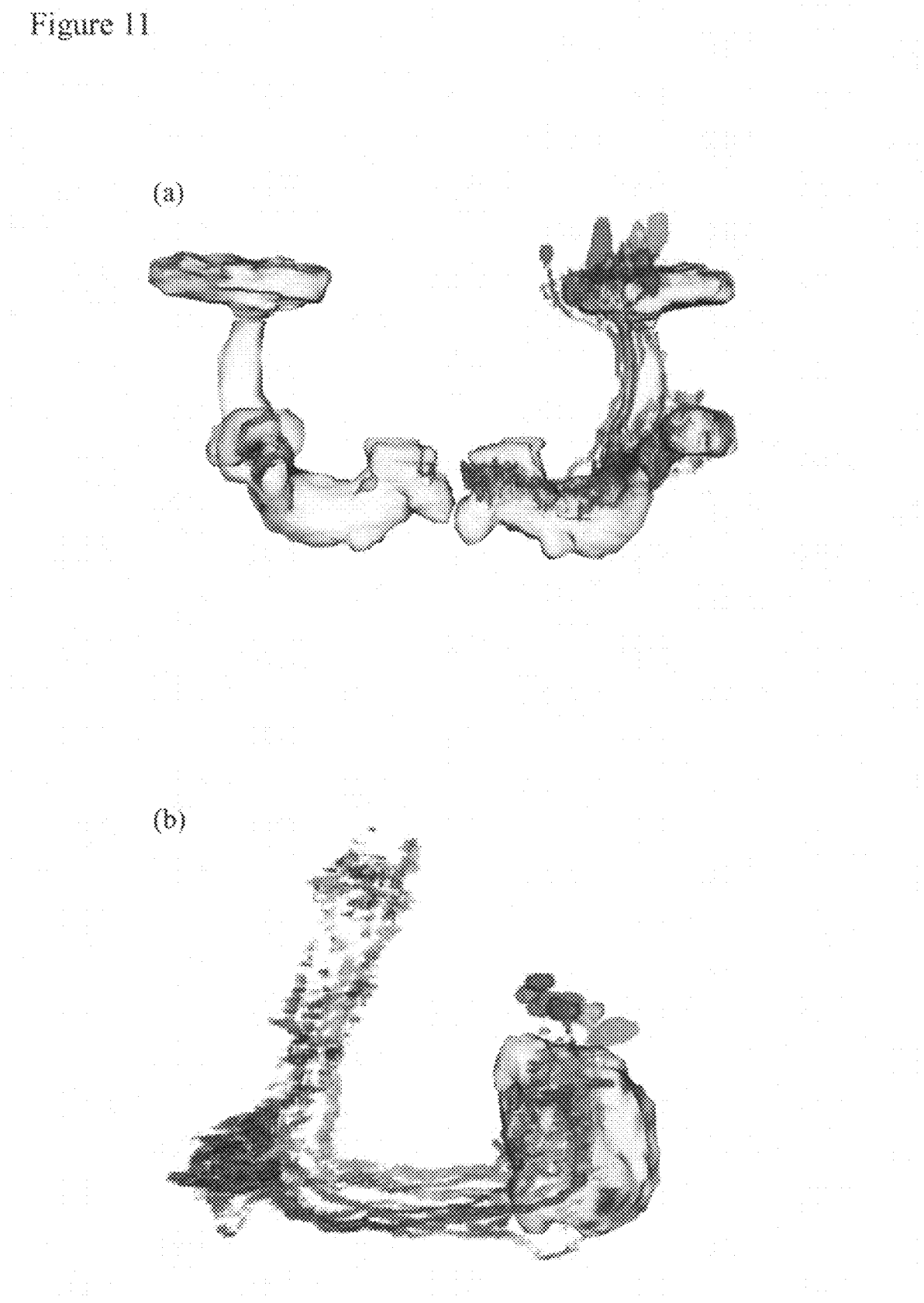
FIGS. 11*a* and 11*b* represent the rich synapses from of neurons with similar structure are distributed in calyx region (Gad1-F-200041, VGlut-F-600439, VGlut-F-500063, Gad1-F-900026, VGlut-F-400229, VGlut-F-600143, Gad1-F-400004 and Gad1-F-200005).

Within the database, another neuronal group with similar three-dimensional structures was also found in the same region. FIG. 11 represented neurons with similar structures; the neurons were listed below: (Gad1-F-200041, VGlut-F-600439, VGlut-F-500063, Gad1-F-900026, VGlut-F-400229, VGlut-F-600143, Gad1-F-400004 and Gad1-F-200005).

Therefore, it was predicted that these neuronal groups have neuronal connection with rich synapses in calyx region, and the prediction has be verified by experimental neurobiologists (S. R. et al., *Nature* 452, 473-477 (2008)).

Classifying three-dimensional neuronal structures in *Drosophila* brain space provided a fast and full-scale analysis of interconnections of neurons. Such rational predictions of neurons synapses with similar three-dimensional structures provided an anatomical road map for predicting and validating synaptic connections within functional circuits in the *Drosophila* brain.

EXAMPLE 7

Neuron ID Table

Figure 12:
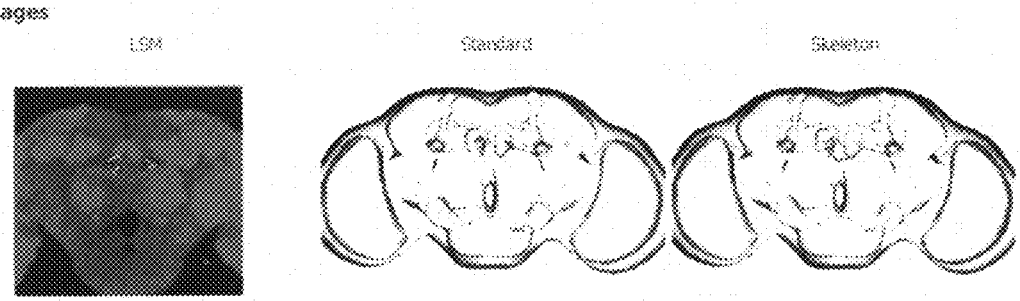
FIG. 12 illustrates a neuron ID table which presents general information of neuron image data selected by users and neuron images having similar three-dimensional structures or space coordinates with said neuron.
Figure 12:
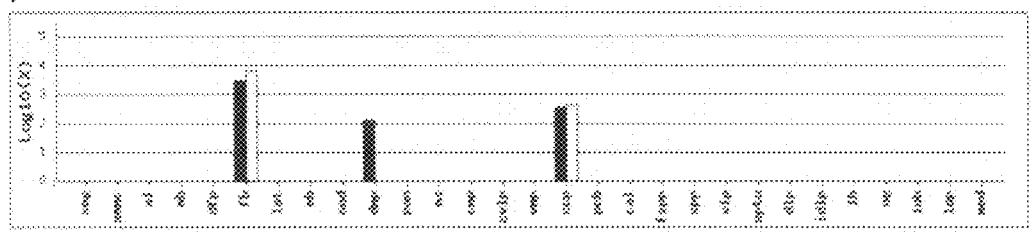
Figure 12:

The results of the above embodiments could be summarized in a neuron ID table (FIG. 12).

A neuron ID table demonstrated general information of neuron selected by users, which included the images of said neuron, space distribution of said neuron, space code of said neuron and neuron images having similar three-dimensional structures or space coordinates with said neuron. The synapses of these neurons were closely connected.

The general information of neuron comprised the name, coordinate and author of said neuron image, while also include the origin of said neuron sample such as labeled gene, reporter system (stock) and type of neurotransmitter released by said neuron. The general information of neuron would also revealed gender, age and lineage of *Drosophila* and birth timing of embryo.

Accordingly, the reader will see that the method of this invention can be used for transforming spatial distribution information of image into a sequence of characters, which is simplified as space code. In addition, the invention will apply neuron image comparison by aligning neuron images according their space code. Furthermore, the method of space coding has advantages in that The method can be applied for structural analysis of single neuron network, which switch the neuroscience studying from the molecular level to the cognitive level.

The method can extract route information of space images by processing the images into space codes thereby helps minimize the size of image files.

The method is useful for image comparison thereby find out space images that travels through the same route or neuron images that innervate the same brain region.

Although the description above contains much specificity, these should not be constructed as limiting the scope of the invention but as merely providing illustrations of some of the presently preferred embodiments of the present invention. For example, the space code can be any alphabets or numerals of any languages or symbols used in any fields. Furthermore, the space coding method can be used for processing complicated geographical networks images such as traffic routes or electrical circuits, or applied for analyzing logical interconnections between interconnect nodes.

Thus the scope of the invention should be determined by the appended Claims and their legal equivalents, rather than by the example given.

What is claimed is:

1. A method of three dimensional (3D) image data processing and collecting processed data in a designated database to represent 3D route, comprising the following steps:
   (a) selecting image data from a source file, wherein a 3D image presents a structure spanned within multiple space regions in a standard area;
   (b) dividing the 3D image with voxels, and defining each space region with different characters;
   (c) transforming spatial distribution information of the 3D image into a sequence of characters, which is simplified as space code; and
   (d) collecting the image data and the results of the previous step into a non-transitory computer-readable recording medium, wherein transforming spatial distribution information of the 3D image into a sequence of character comprises the following steps:
   (a1) evaluating spatial distribution information of the 3D image in each space region by the results of equation: A times $[\log_y m]$, wherein A indicates the character of each space region, y is a positive real number, m stands for the voxel numbers of the 3D image and $[\log_y m]$ is an integer;
   (a2) transforming the results of (a1) into characters, wherein the quantification of spatial distribution information in each space region is represented by a plural number of "A"s, which represents the $[\log_y m]$ times of repetition of "A";
   (a3) combining repeated characters of each space region to form a sequence of characters, which is called a space code; and
   (a4) selecting a hub position in the 3D image and rearranging the space code of (a3) according to the topology of routes starting from the hub position.

2. The method of claim 1, wherein the 3D image comprises biological image and route map.

3. The method of claim 2, wherein the biological image is fly neuron image comprising neuron cell bodies and neuropils.

4. The method of claim 2, wherein the route map comprises geographic locations and routes connecting each location.

5. The method of claim 1, wherein the standard area is defined as a region of certain voxel numbers covered by a curved surface and a stationary environment consisting of fixed biological anatomic regions or geographic locations.

6. The method of claim 1, wherein each space region is defined by single character.

7. The method of claim 6, wherein the character comprises alphabets and numerals.

8. The method of claim 1, wherein the spatial distribution information is defined with the voxel numbers of the image in each space region.

9. The method of claim 1, wherein the hub position is defined by the crossings of routes in the same space region or between different space regions.

* * * * *